(12) United States Patent
Smith

(10) Patent No.: US 6,692,053 B1
(45) Date of Patent: Feb. 17, 2004

(54) DUAL PURPOSE STORAGE AND HOLDING SYSTEM

(75) Inventor: Nels R. Smith, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/041,656

(22) Filed: Jan. 4, 2002

(51) Int. Cl.$^7$ .................................................. B60R 7/00
(52) U.S. Cl. ........................ 296/37.1; 296/37.8; 224/282
(58) Field of Search ............................... 296/37.1, 37.5, 296/37.8, 37.9, 37.12, 37.13, 37.15, 37.16; 224/483, 282, 237

(56) References Cited

U.S. PATENT DOCUMENTS

| | | | | |
|---|---|---|---|---|
| 2,082,158 A | * | 6/1937 | Hagerty | 296/37.9 |
| 2,082,181 A | * | 6/1937 | Pressnall | 296/37.9 |
| 2,174,244 A | * | 9/1939 | Jacobs | |
| RE21,441 E | * | 4/1940 | Visser | 296/37.9 |
| 2,221,959 A | * | 11/1940 | Visser | |
| 2,345,185 A | * | 4/1944 | Perry | |
| 2,445,914 A | * | 7/1948 | Hendricks | 296/37.9 |
| 2,982,393 A | * | 5/1961 | Erbst | 224/282 |
| 3,386,765 A | * | 6/1968 | Drach, Jr. | 296/37.12 |
| 3,503,648 A | * | 3/1970 | James | 296/37.12 |
| 4,355,837 A | * | 10/1982 | Shimizu et al. | 296/37.12 |
| 4,453,760 A | * | 6/1984 | Hira | 296/37.13 |
| 4,552,399 A | * | 11/1985 | Atarashi | 296/37.12 |
| 5,280,870 A | * | 1/1994 | Chick et al. | 224/282 |
| 5,397,160 A | * | 3/1995 | Landry | 296/37.8 |
| 5,439,154 A | * | 8/1995 | Delligatti | 224/237 |
| 5,505,516 A | * | 4/1996 | Spykerman et al. | 248/311.2 |
| 5,516,016 A | * | 5/1996 | Anderson et al. | 224/282 |
| 5,975,393 A | * | 11/1999 | Bellamy | 224/237 |
| 6,019,334 A | * | 2/2000 | Shinomiya | 224/282 |
| 6,409,136 B1 | * | 6/2002 | Weiss et al. | 296/37.14 |
| 6,428,075 B2 | * | 8/2002 | Kamemizu et al. | 296/37.1 |
| 2002/0084666 A1 | * | 7/2002 | Toppani | 296/37.12 |
| 2002/0179660 A1 | * | 12/2002 | Schaal | 224/282 |

FOREIGN PATENT DOCUMENTS

JP          401314643     * 12/1989 ................ 296/37.1

* cited by examiner

*Primary Examiner*—Dennis H. Pedder
*Assistant Examiner*—Hilary Gutman
(74) *Attorney, Agent, or Firm*—Foley & Lardner

(57) ABSTRACT

A storage and holding system includes at least one structure forming a cavity having an opening, a first flap and a second component. The first flap is adapted to move between at least a first covering position in which the first flap covers a first portion of the opening and a second open position in which the first flap extends into the cavity to provide access to the cavity. The second component is adapted to be moved between at least a first closed position in which the second component covers a second portion of the opening and a second open self-supported position in which the component is adapted to preform a holding function.

37 Claims, 7 Drawing Sheets

DUAL PURPOSE STORAGE AND HOLDING SYSTEM

CROSS-REFERENCE TO RELATED APPLICATIONS, IF ANY

None.

BACKGROUND OF THE INVENTION

1. Field of the Invention

The present invention relates generally to storage and holding systems, and in the preferred embodiment, to storage and holding systems for vehicles. Still more specifically, the present invention relates to a dual purpose storage and holding system which can be used for alternately storing or holding two different articles. In the illustrated embodiment, the system may alternately store a cellular telephone or hold a beverage can.

2. Description of the Related Art

A wide variety of storage and holding systems are known for use in a variety of locations. For purposes of illustrating the present invention, storage and holding systems located in vehicles will be discussed. More particularly, storage and holding systems useful in vehicles such as cars, SUVs, vans, trucks, and the like, will be mentioned. It should be understood at the outset, however, that the dual purpose storage and holding system may be used in other types of vehicles (such as boats, buses, trains, airplanes, and the like) or in non-vehicle applications, as will be readily appreciated by those skilled in the art after they read this specification and examine the FIGURES.

In vehicles, a large number of storage and/or holding systems are already known. These may be located in the door trim panels, in overhead systems, in the instrument panel, in seats, in the center consoles, in side trim panels, in rear storage areas such as trunks of cars or cargo storage areas in vans and SUVs, etc. Many of these systems include compartments or cavities. An example of the latter would be the well-known cup holders and coin storage compartments found on numerous vehicles and which are opened by pushing on a portion of a pivotable plate and allowing a spring system to open the storage area.

Items commonly stored in vehicles include sunglasses, garage door openers, coins, beverage containers, CD's or DVD's, maps, infotainment materials, food and beverage items, writing materials, and a myriad of other articles.

Two items commonly used in vehicles today are cellular telephones and beverage cans. Clips for holding cellular telephones which may be added by the user are available in the aftermarket, and a cellular telephone may be dropped into storage wells or placed into storage compartments of center consoles, door pockets, overhead systems, and the like. Common holding systems include can holders. These frequently are located in retractable devices in the instrument panels, center consoles, and other locations, and in some vehicles, the holders are always available for use and are located in the center console system or elsewhere.

To the knowledge of the present inventor, no system has been developed for vehicles which allows for the alternate storage and holding of a cellular telephone and a beverage can. A system which would perform both functions, which could be substantially concealed when not in use, and which would be inexpensive to manufacture and assemble into a vehicle would represent a significant advance in this art.

FEATURES AND SUMMARY OF THE INVENTION

A primary feature of the present invention is to provide a dual purpose storage and holding system.

A second feature of the present invention is to provide a vehicle storage system which is capable of alternately holding two different items.

A further feature of the present invention is to provide a storage and holding system for two items which is substantially concealed when not in use.

A different feature of the present invention is to provide a storage and holding system which may be located in a variety of locations within a vehicle.

A still further feature of the present invention is to provide a dual purpose storage and holding system which may be constructed using known components.

How these and a variety of other features of the present invention are accomplished individually, collectively, or in various subcombinations will be described in the following detailed description of the preferred embodiment of the invention, taken in conjunction with the drawings. Generally, however, they are provided in a dual purpose storage and holding system which is installed in a cavity of a vehicle, such as in a console or instrument panel. The preferred system includes a flap and a holding component, one hinged at the top and the other at the bottom. The flap may be pushed inwardly so that an article, such as a cellular telephone, can be inserted into the cavity and be held in place by the holding component. In the alternate mode, the holding component pivots and may include, for example, a cup holder or beverage can holder. In this configuration, the flap is in its normal position. When the beverage is consumed, the holding component may be closed to substantially conceal the dual purpose storage and holding system. Other items may be held by the holding component when it is in a deployed position, such as pads of note paper, juice boxes, french fry containers, etc., and other features of the invention will become apparent to those skilled in this art after they have read the present specification. Such features are deemed to fall within the scope of the present invention if they fall within the scope of the claims which follow.

DETAILED DESCRIPTION OF THE PREFERRED EMBODIMENT

Before beginning the detailed description of the preferred embodiment of the present invention, several general comments can be made about the applicability and the scope thereof. First, while the preferred embodiment is illustrated as being located in an instrument panel, other locations can be used as indicated above, including consoles, door trim locations, seats, side trim locations, and the like.

Second, the materials used to construct the preferred embodiment include polymers for the upper and lower components and steel for the spring elements. Other materials used in the vehicle trim art can be substituted therefor by those skilled in the art after they have read this specification.

Third, while the preferred embodiment is illustrated in connection with a particular type of beverage can holder, different types of beverage holders known to the art may be placed thereon or components unrelated to beverage can holders may be substituted therefor. For example, the lower component could include a note pad holder including a clip to retain the pad, or a stack of sticky notes could be placed thereon.

Fourth, while two particular mechanisms are used to show how the components are mounted and pivoted, they are for discussion purposes only, and a wide variety of other rotational, translational, sliding, pivoting, push-pull or push-release mechanisms can be used. In addition, rather than using springs, hydraulic, pneumatic, or other mechanisms can be used to control the speed of release or the force required for activation or the components. They can be moved or restrained by mechanical systems, servo-motors, worm gears, and the like. Accordingly, any system which allows the upper component to be moved for permitting storage of a cellular telephone or similar article (the term "similar article" being used to refer to shape, not operation or intended use), and for the holding component to be moved to allow it to perform its intended function, can be employed.

Fifth, decorative recesses are shown in the FIGURES for aesthetic purposes only, and other decorative recesses, protrusions, or the like, may be employed without departing from the invention's intended scope.

Figure 1:
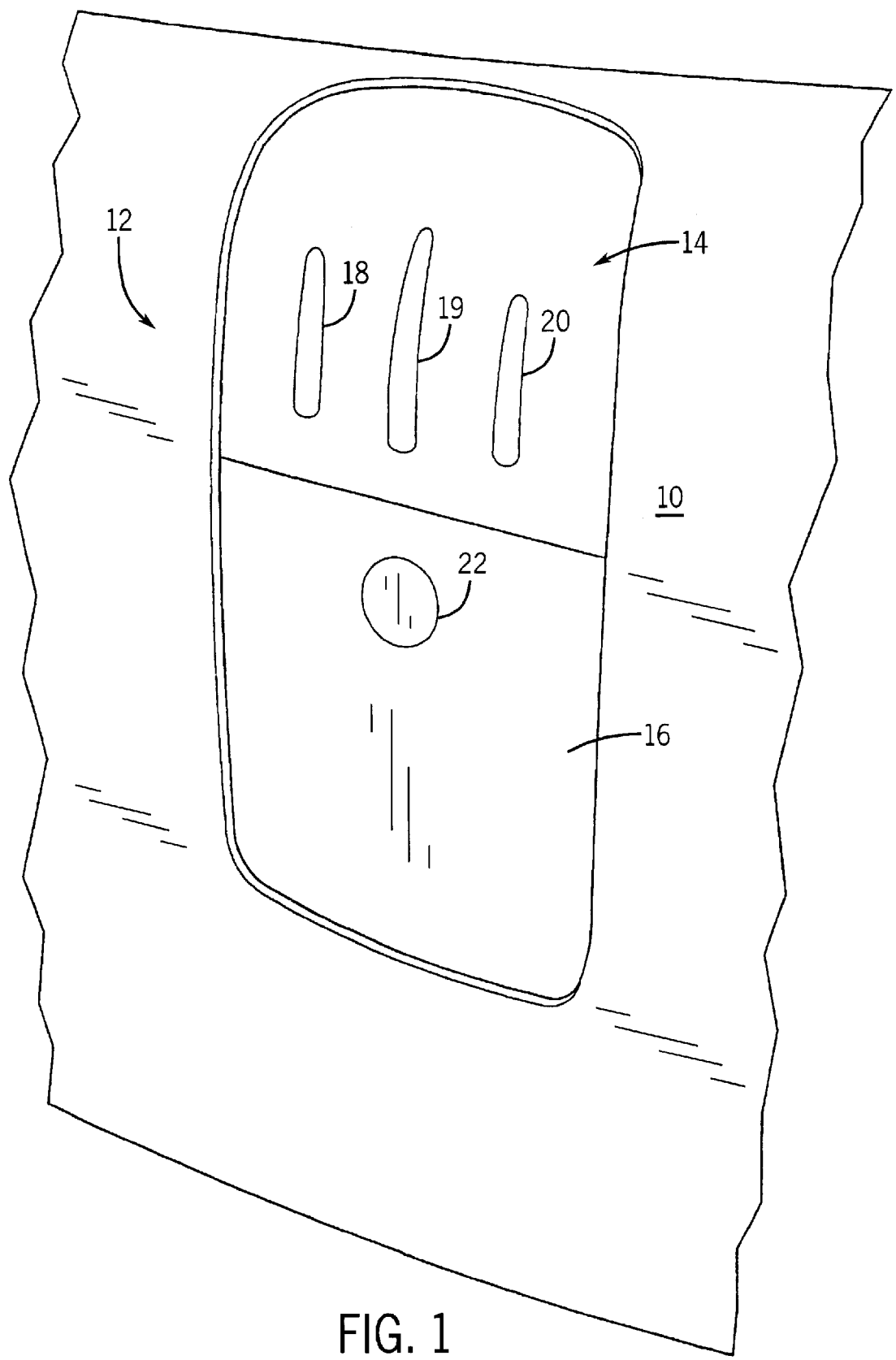
FIG. 1 is a perspective view of the exterior portions of a storage and holding system according to the preferred form of the present invention.

Proceeding now to a description of the preferred embodiment, FIG. 1 shows a portion of a vehicle instrument panel 10 and the storage and holding system 12 according to the preferred embodiment of the present invention. Storage and holding system 12 includes an upper flap 14 and a lower holding component 16 (second closure means), the internal configuration of which will be described below. Three generally parallel decorative recesses 18, 19 and 20 are formed in the upper flap 14 (first access means), while a circular recess 22 is formed in the upper portion of lower component 16.

Figure 2:
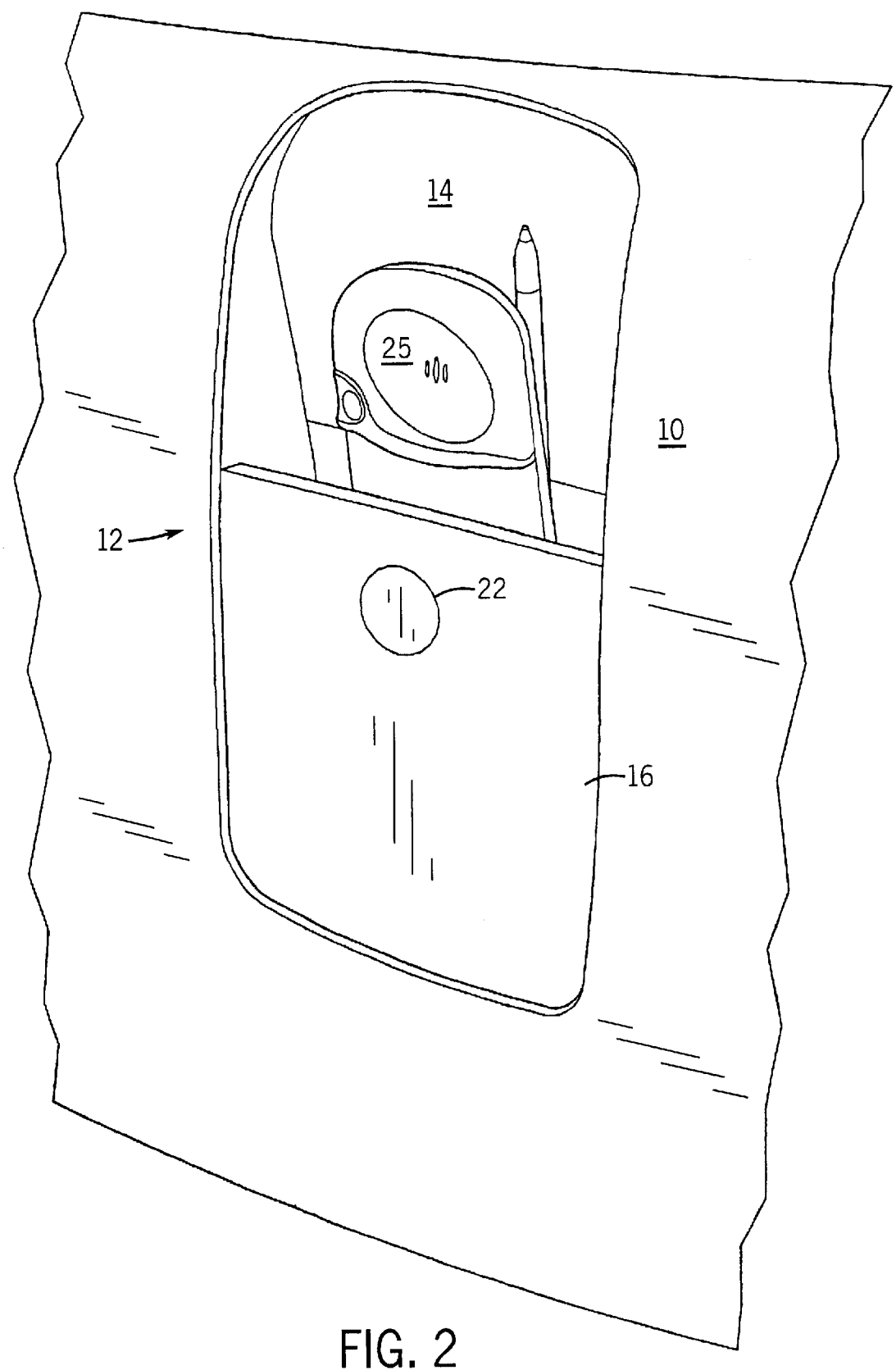
FIG. 2 is a perspective view of a cellular telephone held by the storage and holding system of the preferred embodiment of the present invention.

Referring to FIG. 2, a cellular telephone 25 is shown inserted into storage and holding system 12. This is accomplished by pivoting the lower end of flap 14 inwardly to allow the telephone 25 to be inserted behind the lower component 16.

Figure 3:
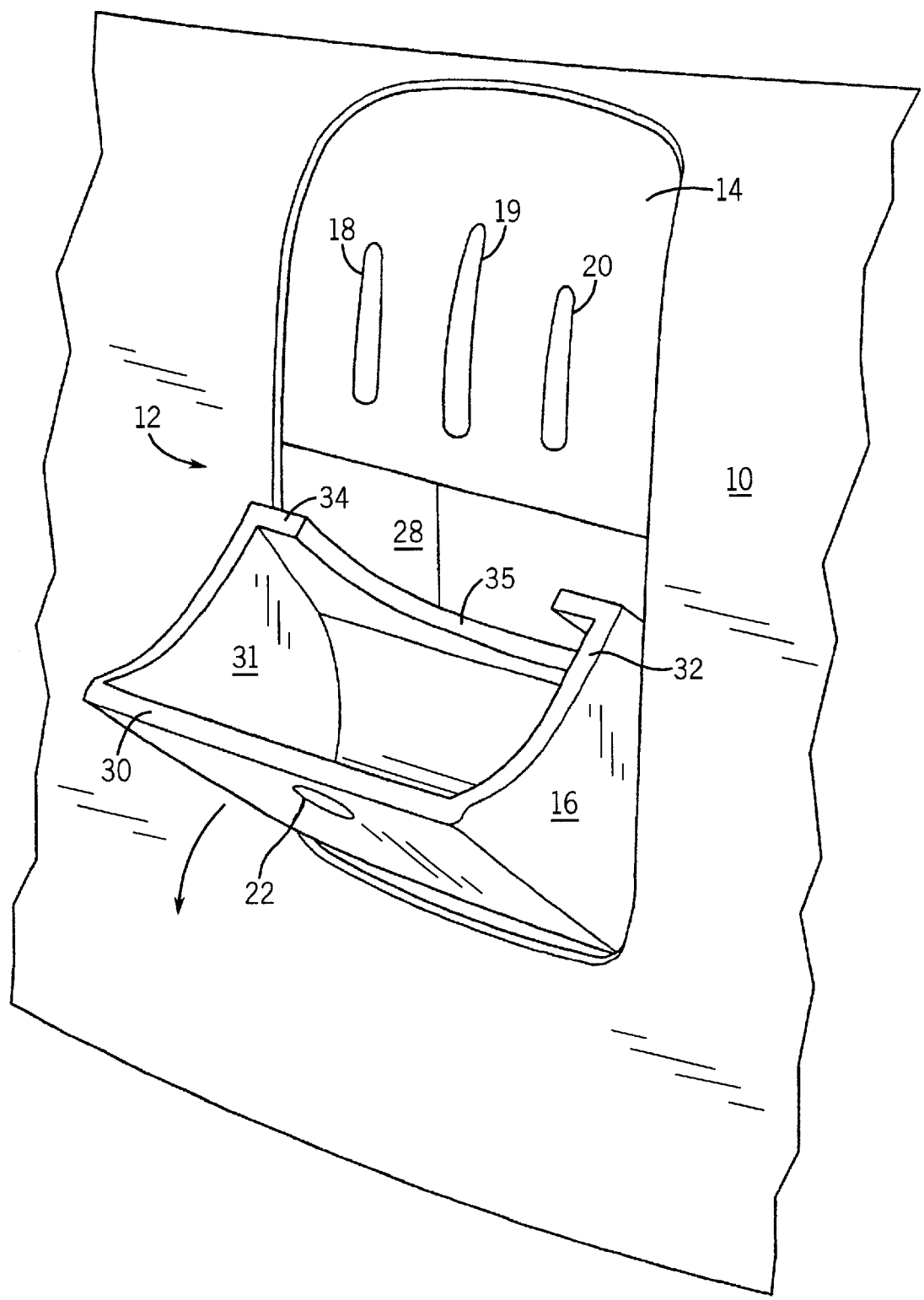
FIG. 3 is a perspective view showing the lower component of the storage and holding system of the preferred embodiment of the present invention in a partially rotated position.
Figure 4:
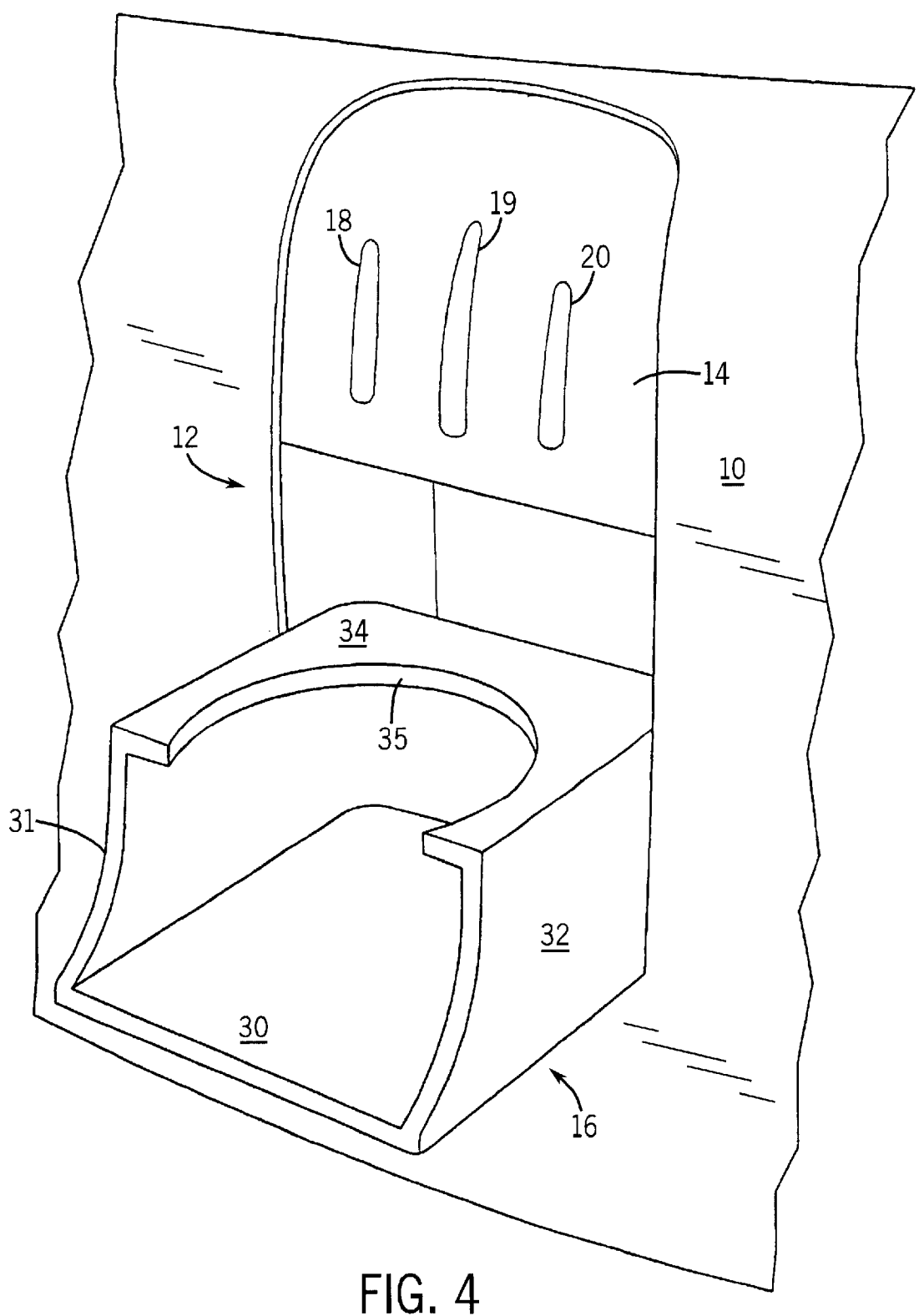
FIG. 4 is a perspective view of the storage and holding system of the preferred embodiment of the present invention with the lower component fully lowered.

In FIG. 3, the storage and holding system 12 is shown in a different configuration, i.e., with upper flap 14 in its normal position and the lower component 16 partially rotated in the direction shown by the arrow. A cavity 28 is shown in the instrument panel which may be a portion of the storage and holding system 12 or may be formed in the instrument panel itself. Lower component is shown in this view to include a front wall 30, a pair of side walls 31 and 32, and a rear wall 34 having an arcuate surface 35 formed therein. Front wall 30 and rear wall 34 are generally parallel to one another. These components are shown in a different orientation (with lower component 16 fully lowered) in FIG. 4. As can be appreciated from FIG. 4, the arcuate opening 35 and wall 34 are generally horizontal to allow insertion of a beverage can, cup, bottle, or other similarly shaped item. Alternatively, for example, when in the FIG. 3 orientation, the space between the front wall 30 and the rear wall 34 could hold a juice box, a container of french fries or a variety of other food, beverage or non-consumable articles.

Figure 5:
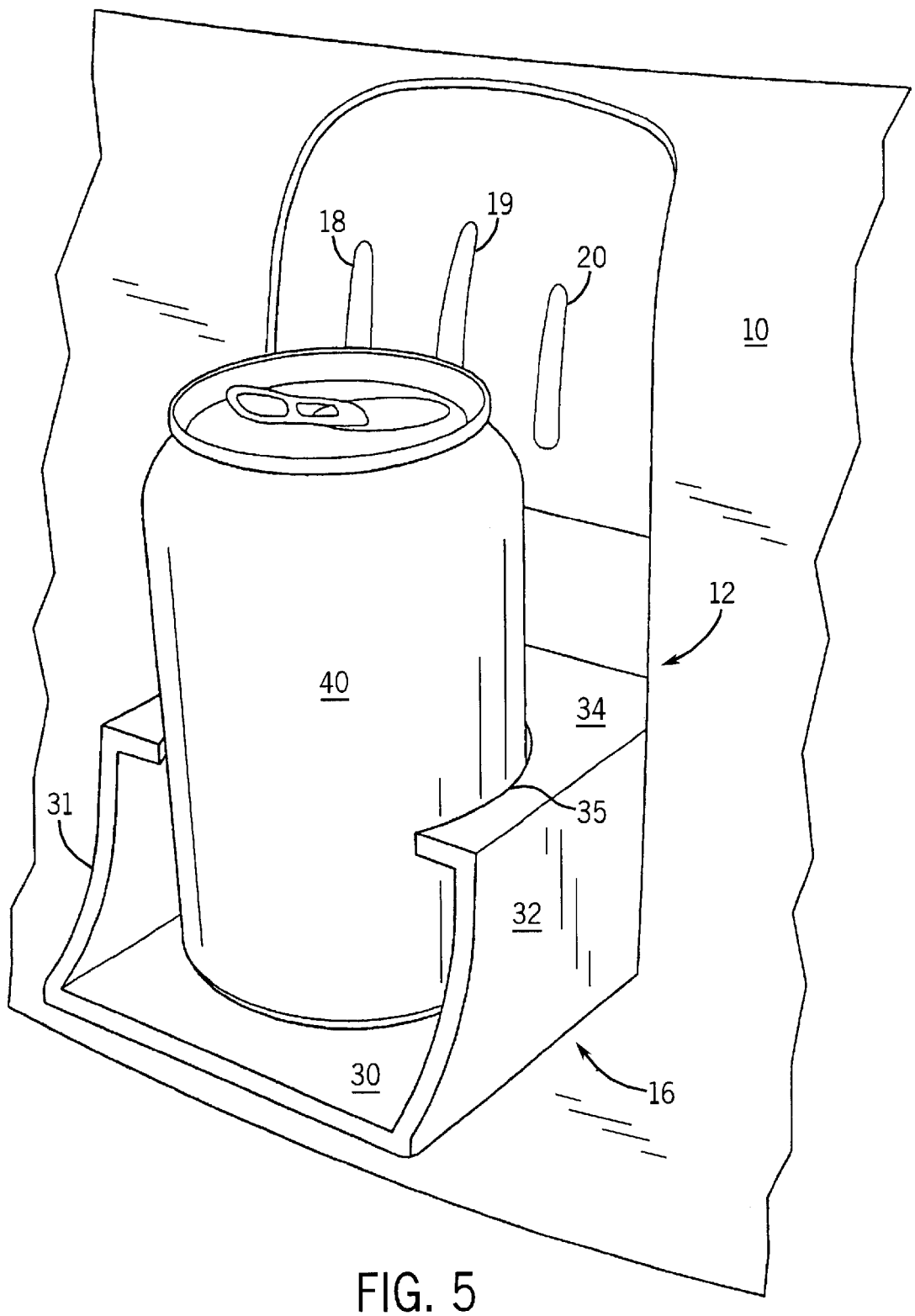
FIG. 5 is a perspective view showing the storage and holding system of the preferred embodiment of the present invention holding a beverage can.

A beverage can 40 is shown placed in the lower component 16 in FIG. 5.

Figure 6:
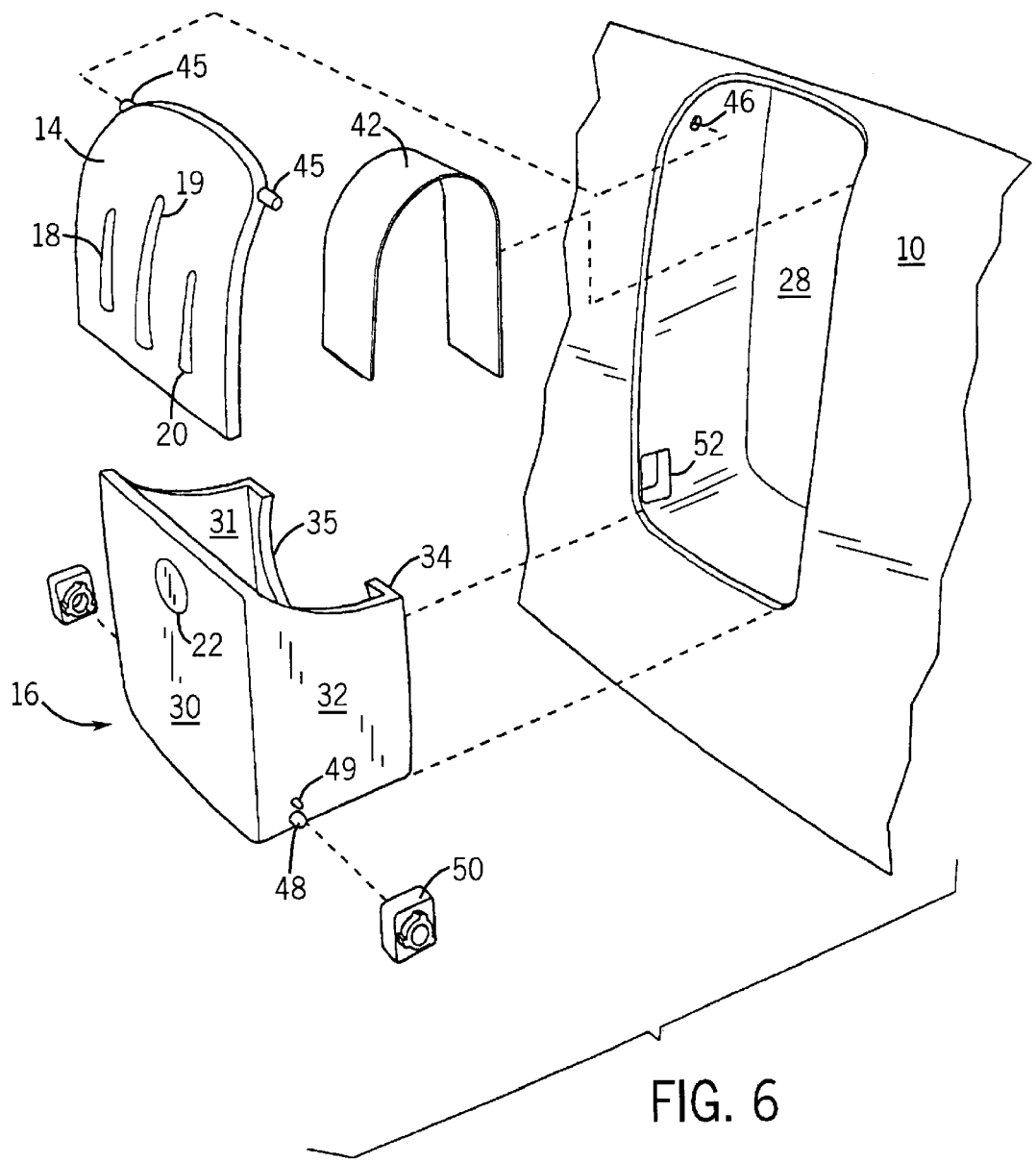
FIG. 6 is an exploded view of the components of the storage and holding system according to the preferred embodiment of the invention.
Figure 7:
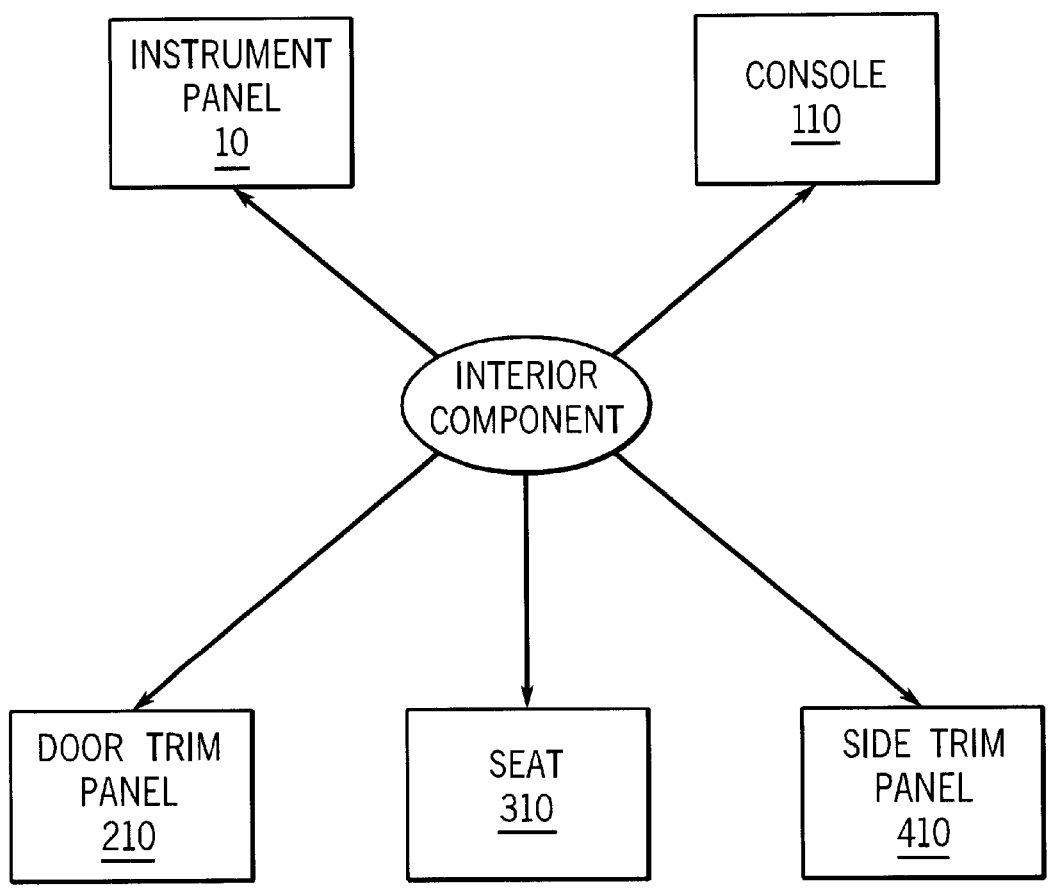
FIG. 7 is a block diagram schematically illustrating various interior components including an instrument panel, a console, a door trim panel, a seat and a side trim panel in which a cavity of the storage and holding system may be formed.

Finally, FIG. 6 shows an exploded view of one form of a storage and holding system according to the preferred embodiment of the invention. It will be seen here that cavity 28 is formed within the instrument panel 10 and that a U-shaped spring 42 is located behind upper flap 14 to bias flap 14 to its position shown in FIG. 1. Its attachment could be either to the rear wall of cavity 28 or, as is the case here, into a pocket (not shown) in the rear of flap 14. Flap 14 also includes a pair of co-axial rods 45 which extend from the top upper corners of flap 14 and are adapted to be received in openings 46 in instrument panel 10. Lower component 16 also includes a mounting arrangement which is, in and of itself, is well known in the vehicle art. A pair of adjacent rods 48 and 49 extend from each of side walls 31 and 32 and enter dampers 50 located on either side. Dampers 50 are located in generally rectangular openings 52 within cavity 28. The particular illustrated system allows the user to press inwardly on recess 22, causing the release of the component and the downward rotation thereof to the horizontal position. Similarly, when it no longer desired to have the beverage holder component 16 deployed, it is simply lifted up by the operator to the vertical position and pushed slightly beyond vertical to lock it in place until the next deployment is desired. One or more springs could be added to the deployment arrangement for lower component 16 to bias or restrain it to any of its normal or deployed positions.

FIGS. 7–10 illustrate storage and holding system 12 formed in a console 110, a door trim panel 210, a seat 310 and a side trim panel 410, respectively.

While the present invention has been described in connection with a single preferred embodiment, the invention is not to be limited to that description, but is to be limited solely by the scope of the claims which follow. Materials, dimensions, textures, size relationships, decorative aspects, and the like may all be varied depending upon the ultimate place of intended use and the types of articles to be stored and held.

What is claimed is:

1. A storage and holding system comprising:
   at least one structure forming a cavity having an opening;
   a first flap adapted to be moved between at least a first covering position in which the first flap covers a first portion of the opening and a second access position in which the first flap extends into the cavity to provide access to the cavity; and
   a second component adapted to be moved between at least a first closed position in which the second component covers a second portion of the opening and a second open self-supported position in which the component is adapted to perform a holding function.

2. The storage and holding system of claim 1, wherein the cavity is formed in a vehicle.

3. The storage and holding system of claim 2, wherein the cavity is formed in a vehicle interior component.

4. The storage and handling system of claim 3, wherein the interior component is selected from the group consisting of an instrument panel, a console, a door trim panel, a seat, or a side trim panel.

5. The storage and handling system of claim 1, wherein the cavity is adapted to hold a cellular telephone when the first flap is moved to the second access position.

6. The storage and handling system of claim 1, wherein the first flap is biased to the first covering position.

7. The storage and handling system of claim 1, wherein the holding function is a beverage container holding function.

8. The storage and handling system of claim 7, wherein the second component includes a front wall, a pair of side walls, and a rear wall, the rear wall including an opening permitting the insertion of a beverage container therein.

9. The storage and handling system of claim 8, wherein the beverage container is a can.

10. The storage and handling system of claim 7, wherein the first flap is in the first covering position when the second component is performing the beverage container holding function.

11. The storage and holding system of claim 1, wherein each of the first flap and second component are mounted for pivotal rotation about parallel axes.

12. The storage and holding system of claim 11, wherein a damper is included for the first flap.

13. The storage and holding component of claim 1, wherein the cavity is in a vehicle instrument panel and is sized to receive a cellular telephone when the first flap is in the second access position, and the second component is in the first closed position, and wherein the second component is adapted to hold a beverage container when in the second open position, and the first flap is in the first covering position.

14. The storage and holding system of claim 1, wherein the second component includes a holding cavity configured to perform the holding function.

15. The storage and holding system of claim 1, wherein the second component is self-supported in a substantially horizontal orientation when in the second open position of the second component.

16. The storage and holding system of claim 1, wherein the first flap has a first exterior surface facing away from the cavity, wherein the second component has a second exterior surface facing away from the cavity and wherein the first exterior surface and the second exterior surface are substantially flush with one another when the first flap is in the first covering position and when the second component is in the first closed position.

17. The storage and holding system of claim 16, wherein the at least one structure has a third exterior surface peripheral to the cavity and facing away from the cavity, wherein the third exterior surface is substantially flush with the first exterior surface and the second exterior surface when the first flap is in the first covering position and when the second component is in the first closed position.

18. The storage and holding system of claim 1, wherein the second component includes a front wall, a pair of side walls and a rear wall forming an interior volume and wherein the second component further includes an axial opening providing access to the interior volume.

19. The storage and holding system of claim 18 including at least one surface formed in the rear wall and adapted to engage a side wall of a beverage container.

20. The storage and holding system of claim 19, wherein the surface defines an aperture extending through the rear wall.

21. A storage and holding system for a vehicle interior comprising at least one structure forming a cavity having a front opening, a first access means for covering a first portion of the front opening and for being movable into the cavity to allow selective storing of an article in the cavity, and a second closure means for covering another portion of the front opening, and being movable from a closed position to a self-supported holding position.

22. The storage and holding system of claim 21, wherein the cavity is located in a vehicle interior component selected from the group consisting of an instrument panel, a console, a door trim panel, a seat, or a side trim panel.

23. The storage and holding system of claim 21, wherein the second closure means includes a beverage container receiver.

24. The storage and holding system of claim 21, wherein the first access means is a first pivotable flap and the second closure means includes a beverage container receptacle.

25. The storage and holding system of claim 24, wherein the receptacle is pivotable out of the cavity to allow holding a beverage container to be placed therein.

26. The storage and holding system of claim 25, wherein movement of the flap is spring biased.

27. The storage and holding system of claim 21, wherein the second closure means includes at least one surface adapted to engage a side of a beverage container when the second closure means is in the holding position.

28. The storage and holding system of claim 21, wherein the second closure means is substantially horizontal when in the holding position.

29. The storage and holding system of claim 21, wherein the first access means has a first exterior surface facing away from the cavity, wherein the second closure means has a second exterior surface facing away from the cavity, wherein the first exterior surface and the second exterior surface extend substantially flush with one another when the first access means covers the first portion of the front opening and when the second closure means is in the closed position.

30. The storage and holding system of claim 21, wherein the second closure means includes a front wall, a pair of side walls and a rear wall forming an interior volume and wherein the second closure means includes an axial opening providing access to the interior volume.

31. The storage and holding system of claim 30 including at least one surface in the rear wall adapted to engage a side of a beverage container.

32. A storage and holding system comprising:
at least one structure forming a cavity having an opening;
a first flap configured to move between at least a first covering position in which the opening is at least partially covered and a second access position in which access to the cavity is provided; and
a second component configured to move between at least a first closed position in which the second component covers a portion of the opening and a second self-supported open position in which the second component is configured to perform a holding function, wherein the second component includes a front wall, a pair of side walls and a rear wall forming an interior volume, and wherein the second component further includes an axial opening providing access to the interior volume, wherein the axial opening faces in at least one of a horizontal or an upwardly angled direction when the second component is in the second open position.

33. The storage and holding system of claim 32 including at least one surface proximate the rear wall and configured to engage a side of a beverage container.

34. The storage and holding system of claim 33, wherein the at least one surface is provided by an aperture extending through the rear wall.

35. The storage and holding system of claim 34, wherein the aperture and the axial opening extend perpendicular to one another.

36. The storage and holding system of claim 32, wherein the first flap has a first exterior surface and wherein the front wall has a second exterior surface, and wherein the first exterior surface and the second exterior surface extend substantially flush with one another when the first flap is in the covering position and when the second component is in the closed position.

37. The storage and holding system of claim 32, wherein the second component is substantially horizontal when in the second open position.

\* \* \* \* \*